US012624665B2

(12) United States Patent
Barve et al.

(10) Patent No.: US 12,624,665 B2
(45) Date of Patent: May 12, 2026

(54) PURGE SYSTEM FOR DUAL-FUEL GAS TURBINE ENGINE

(71) Applicant: Vericor Power Systems LLC, Alpharetta, GA (US)

(72) Inventors: Vinayak Barve, Suwanee, GA (US); David Plaza, Gilbert, AZ (US); Alex Starr, Atlanta, GA (US); Joseph McMurry, Traverse City, MO (US); Mike Yarnold, Saint Paul, MN (US); Christopher Beebe, Atlanta, GA (US); Yanxia Sun, Alpharetta, GA (US)

(73) Assignee: Vericor Power Systems LLC

( * ) Notice: Subject to any disclaimer, the term of this patent is extended or adjusted under 35 U.S.C. 154(b) by 0 days.

(21) Appl. No.: 18/462,144

(22) Filed: Sep. 6, 2023

(65) Prior Publication Data

US 2024/0077038 A1    Mar. 7, 2024

Related U.S. Application Data

(60) Provisional application No. 63/374,671, filed on Sep. 6, 2022.

(51) Int. Cl.
  F02C 9/40 (2006.01)
  F02C 3/22 (2006.01)
  (Continued)

(52) U.S. Cl.
  CPC ................. F02C 9/40 (2013.01); F02C 3/22 (2013.01); F02C 3/24 (2013.01); F02C 7/222 (2013.01);
  (Continued)

(58) Field of Classification Search
  CPC .. F02C 7/222; F02C 7/22; F02C 7/228; F02C 9/40; F02C 9/34; F23R 2900/00004;
  (Continued)

(56) References Cited

U.S. PATENT DOCUMENTS 5,836,163 A * 11/1998 Lockyer ................ F23D 17/002
                                                      60/737
5,983,962 A    11/1999 Gerardot
                (Continued)

FOREIGN PATENT DOCUMENTS

CN    110469314 A    11/2019
CN    110848028 A    2/2020
            (Continued)

OTHER PUBLICATIONS

International Search Report and Written Opinion in International App. No. PCT/US2023/073539 dated Jan. 4, 2024, 15 pages.

*Primary Examiner* — Gerald L Sung
*Assistant Examiner* — Jingchen Liu
(74) *Attorney, Agent, or Firm* — Smith Baluch LLP

(57)    ABSTRACT

A dual-fuel turbine engine is a type of turbine engine that can operate using two different fuel sources, such as liquid fuel (e.g., diesel) and natural gas. For liquid fuels, the turbine engine includes a primary line to facilitate engine startup and a secondary line to modify power output. Generally, the turbine engine only uses one type of fuel for combustion at a time. The fuel lines and passages in the fuel nozzles that carry the unused fuel source should preferably be purged and sealed by a purging system to reduce coking. However, conventional purge systems typically purge and seal only the secondary line for liquid fuels. As a result, the passages in the fuel nozzles connected to the primary line are prone to coking. To address this problem, a purge system is disclosed that purges and seals the primary line and, optionally, the secondary line.

14 Claims, 15 Drawing Sheets

(51) Int. Cl.

| | |
|---|---|
| *F02C 3/24* | (2006.01) |
| *F02C 7/22* | (2006.01) |
| *F02C 7/228* | (2006.01) |
| *F23D 17/00* | (2006.01) |
| *F23K 5/18* | (2006.01) |

(52) U.S. Cl.
CPC ............ *F02C 7/228* (2013.01); *F23D 17/002* (2013.01); *F23K 5/18* (2013.01); *F23D 2209/30* (2013.01); *F23D 2900/00016* (2013.01); *F23R 2900/00004* (2013.01)

(58) Field of Classification Search
CPC ............ F23R 3/34–36; F23D 2209/30; F23D 17/002; F23D 2900/00008; F23D 2900/00016; F23D 2204/10; F23K 2203/105; F23K 2203/10; F23K 5/18; F16N 21/00
See application file for complete search history.

(56) References Cited

U.S. PATENT DOCUMENTS

| | | | |
|---|---|---|---|
| 6,089,252 | A | 7/2000 | Braun |
| 6,123,751 | A | 9/2000 | Nelson et al. |
| 6,145,318 | A | 11/2000 | Kaplan et al. |
| 6,250,065 | B1 | 6/2001 | Mandai et al. |
| 7,721,521 | B2 | 5/2010 | Kunkle et al. |
| 7,730,711 | B2 | 6/2010 | Kunkle et al. |
| 8,340,886 | B2 | 12/2012 | Nenmeni et al. |
| 9,395,049 | B2 | 7/2016 | Vicknair et al. |
| 9,638,101 | B1 | 5/2017 | Crowe et al. |
| 9,656,762 | B2 | 5/2017 | Kamath et al. |
| 9,689,316 | B1 | 6/2017 | Crom |
| 10,221,856 | B2 | 3/2019 | Hemandez et al. |
| 10,865,631 | B1 | 12/2020 | Zhang et al. |
| 10,968,837 | B1 * | 4/2021 | Yeung ........................ F02C 9/40 |
| 11,598,266 | B2 | 3/2023 | Aguilar et al. |
| 11,624,321 | B2 | 4/2023 | Yeung et al. |
| 11,698,028 | B2 | 7/2023 | Yeung et al. |
| 11,746,637 | B2 | 9/2023 | Zhang et al. |
| 11,767,791 | B2 | 9/2023 | Yeung et al. |
| 2001/0004828 | A1 * | 6/2001 | Nakamoto ................ F02C 3/22 60/39.463 |
| 2012/0192542 | A1 | 8/2012 | Chillar et al. |
| 2012/0232768 | A1 | 9/2012 | Nenmeni et al. |
| 2013/0098056 | A1 | 4/2013 | Zhang et al. |
| 2013/0186057 | A1 | 7/2013 | Shanmugam et al. |
| 2014/0261797 | A1 * | 9/2014 | Lior ........................ F01D 25/18 285/133.11 |
| 2016/0186671 | A1 | 6/2016 | Austin et al. |
| 2017/0138268 | A1 * | 5/2017 | Nakahara ................ F23D 17/00 |
| 2018/0172294 | A1 | 6/2018 | Owen |
| 2021/0355883 | A1 * | 11/2021 | Yeung .................... F02C 7/232 |
| 2022/0195929 | A1 | 6/2022 | Aguilar et al. |
| 2022/0325668 | A1 | 10/2022 | Wong et al. |

FOREIGN PATENT DOCUMENTS

| | | |
|---|---|---|
| CN | 210598945 U | 5/2020 |
| WO | 2019060922 A1 | 3/2019 |

* cited by examiner

See Inset View in

207b

207a

255

233

210

230

204

236

PURGE SYSTEM FOR DUAL-FUEL GAS TURBINE ENGINE

CROSS-REFERENCE TO RELATED APPLICATION(S)

This application claims the priority benefit, under 35 U.S.C. 119 (e), of U.S. Application No. 63/374,671, filed Sep. 6, 2022, which is incorporated herein by reference in its entirety for all purposes.

JOINT RESEARCH AGREEMENT

This application is subject to a joint research agreement between BJ Services, LLC, and Vericor Power Systems LLC.

BACKGROUND

A turbine engine is a thermomechanical device used in various power generation and mechanical drive applications, such as oil or natural gas extraction, jet propulsion, and the generation of electricity. Generally, a turbine engine operates by combusting fuel in a combustion chamber to produce a continuous stream of hot gas which, in turn, flows through and drives a downstream turbine. The turbine is mechanically coupled to an upstream compressor. Thus, a portion of the energy of the hot gas is used to drive the compressor and generate pressurized air for combustion with the remaining energy available for different uses depending on the application (e.g., providing thrust or driving an electrical generator).

Over the years, turbine engines have been developed to operate using various liquid and gaseous fuels, such as liquified petroleum gas, kerosene, diesel, syngas, or natural gas. These fuels, however, are often subject to supply disruptions and/or market volatility. Moreover, turbine engines should also meet strict emissions regulations, which are changing as industries move towards decreasing carbon emissions to reduce the effects of climate change.

These aspects coupled with the relatively long operating lifetime of conventional turbine engines (e.g., years, decades) have given rise to turbine engines that can operate using different types of fuels from different fuel sources (also referred to as a "fuel flexible turbine engine"). Compared to turbine engines that operate using only a single fuel source, a fuel flexible turbine engine is less likely to experience disruptions in operation due to sudden shortages in a particular type of fuel source. Fuel flexible turbine engines also allow operators to transition more easily from one type of fuel to another type of fuel (e.g., from liquid fuel to natural gas) particularly as regulations are introduced over time that mandate certain fuel sources over others.

One example of a fuel flexible turbine engine is a dual-fuel turbine engine, which can use two different types of fuel for combustion, such as a liquid fuel (e.g., diesel) and a gaseous fuel (e.g., natural gas). A dual-fuel turbine engine typically operates using only one type of fuel at a time, but can switch between the two fuel sources during operation. In some instances, the changeover between a first fuel source (e.g., a liquid fuel) and a second fuel source (e.g., natural gas) can occur while the turbine engine is operating under full load. Said in another way, the turbine engine can remain in operation when switching between different fuels. This can be accomplished, in part, by incorporating fuel nozzles with multiple passages that supply different fuels to the combustion chamber of the turbine engine so that at least one type of fuel can be continually supplied for combustion. Some dual-fuel turbines can further utilize co-firing where two (or more) fuel sources are supplied simultaneously for combustion.

SUMMARY

Many dual-fuel turbine engines, particularly those used for oil and natural gas extraction, use cold fuel nozzles to inject fuel into their combustion chambers. Cold fuel nozzles are fuel nozzles that are partially disposed within the combustion chamber and operate at temperatures lower than the temperature of the hot gas produced within the combustion chamber. For turbine engines that operate using only a single fuel source, the fuel is transported at relatively cooler temperatures compared to the hot gases produced within the combustion chamber. Thus, the temperature of the fuel nozzle and, in particular, the passage of the fuel nozzle is typically maintained by continuously flowing fuel through the passage of the nozzle.

For dual-fuel turbine engines, however, cold fuel nozzles are often prone to coking. Specifically, the unused passages of the fuel nozzle (i.e., the passages that do not supply a fuel currently being combusted by the turbine engine) may be exposed to the high temperature gases produced within the combustion chamber. This can lead to undesirable heating of the fuel nozzle that damages the nozzle. Additionally, excessive heating may vaporize any unburnt fuel or fuel residue within the unused passages of the fuel nozzle resulting in the formation of hard carbon deposits. Unburnt fuel or fuel residue vaporized near the fuel nozzle may also flow into the unused passages of the fuel nozzle resulting in hard carbon deposits on the inner surfaces of the fuel nozzle and/or fuel lines connected to the fuel nozzle. These deposits can impede and, in some instances, block the flow of fuel through the fuel nozzle. Typically, the risk of coking is greatest when the unused passages in the cold fuel nozzle are exposed to the hot gases in the combustion chamber as described above and when switching between different fuel sources.

In other dual-fuel turbine engines, coking is reduced, in part, with a purge system incorporated in the turbine engine. The purge system provides a purging fluid to purge fuel from the fuel lines and the passages of the nozzle that are being shut down when switching between different fuel sources. The purge system also seals the unused fuel lines and passages of the nozzle by providing a continuous flow of purging fluid to prevent the hot gases from entering the unused passages of the nozzle.

For dual-fuel turbine engines that operate using a liquid fuel and a natural gas, however, conventional purge systems generally do not purge or seal every fuel line and/or passage of each fuel nozzle. The cold fuel nozzles in these dual-fuel turbine engines typically include three passages: (1) a first passage coupled to a primary line to supply a relatively small amount of liquid fuel to facilitate startup of the turbine engine and/or to cool the turbine engine when using liquid fuel (e.g., by supplying a continuous flow of liquid fuel), (2) a second passage coupled to a secondary line to supply the same liquid fuel at variable flow rates depending on the desired power output of the turbine engine, and (3) a third passage coupled to a gas line to supply natural gas for combustion instead of the liquid fuel. Conventional purge systems are often fluidically coupled only to the secondary line or the gas line. As a result, fuel remaining in the passage in the nozzle connected to the primary line (also referred to herein as the primary line passage) is often left exposed to the hot gases produced in the combustion chamber resulting in coking. The coking of the primary line passage is further exacerbated by the relatively small size of the primary line passage compared to the passages connected to the secondary line or the gas line.

The present disclosure is thus directed to inventive purge systems for a dual-fuel turbine engine. Each of these inventive purge systems purges and seals a primary line in addition to the secondary line for the dual-fuel turbine engine. The dual-fuel turbine engine may include a liquid fuel intake system fluidically coupled to at least one fuel manifold via a primary line network and a secondary line network. The dual-fuel turbine engine may also include a natural gas intake system fluidically coupled to the fuel manifold(s) via a gas line network. Each fuel manifold supports multiple fuel nozzles and each fuel nozzle has respective passages connected to the primary line, the secondary line, and the gas line. The primary line network, the secondary line network, and the natural gas line network each include various tubing/piping, fittings, and/or check valves fluidically coupled together to supply the liquid fuel and the natural gas to each fuel nozzle.

The purge system may also include various tubing/piping, fittings, and/or check valves fluidically coupled to at least the primary line network. In some instances, the purge system may also be fluidically coupled to the secondary line network and/or the gas line network. The purge system is generally coupled to a purge source that provides a purging fluid to purge and seal at least some of the fuel lines in the primary line network and the corresponding passages in the nozzles. The purging fluid may be various types of liquids or gases including, but not limited to, air and water.

In one aspect, the purge system may be implemented in the dual-fuel turbine engine without appreciably changing the operation of the fuel systems in the turbine engine. For example, the flow rate of the fuel and/or the fuel pressure that drives the fuel in each fuel line may remain the same or substantially the same as a dual-fuel turbine engine without the purge system. This may be accomplished, for example, by replacing only a single fitting or flow divider to provide an additional port for the purging fluid without altering the other components of the fuel line networks. Herein, a flow divider refers to a component directly coupled to a fuel source (e.g., liquid fuel, natural gas) and divides the flow of fuel between two or more fuel line networks. In one example, a tee fitting (i.e., a fitting with three ports) in the primary line network may be replaced with a cross fitting (i.e., a fitting with four ports) to provide an additional port to connect to the purge system.

In this manner, the purge system may be readily retrofit onto existing dual-fuel turbine engines without appreciably modifying the various fuel line networks. For instance, an inventive purge system can also be added to an existing dual-fuel turbine engine from an inventive kit that includes valves, fittings, tubes, and/or other components for the purge system. Such a kit can be provided separately from the dual-fuel turbine engine itself and assembled onto a new, working, or refurbished dual-fuel turbine engine.

In another aspect, the purge system may provide a common interface to supply purging fluid to the primary line network and the secondary line network when the purge system is fluidically coupled both the primary and secondary lines. For example, a purge system may be fluidically coupled to both the primary line network and the secondary line network. The purge system may further include a single fitting that provides purging fluid to both the primary line network and the secondary line network. This may be accomplished, for example, by incorporating multiple tee fittings and check valves to divide the flow of purging fluid between the primary line network and the secondary line network. Compared to previous purge systems, the common interface provided by the purge systems disclosed herein may appreciably simplify the purge system, in part, because a single purge source and a single compressor may be used to supply purging fluid to the various fuel line networks in the turbine engine.

A dual-fuel turbine engine with a fuel manifold, a fuel nozzle in fluid communication with the fuel manifold, a primary line network connecting a liquid fuel source to the fuel manifold via a first passage of the fuel nozzle, a secondary line network connecting the liquid fuel source to the fuel manifold via a second passage of the fuel nozzle, and a gaseous fuel intake system connected to the fuel manifold via a third passage of the fuel nozzle can be operated as follows. The liquid fuel source supplies a first portion of liquid fuel from to the fuel manifold via the primary line network and the first passage to facilitate startup of the dual-fuel turbine engine. The liquid fuel source supplies a second portion of the liquid fuel to the fuel manifold via the secondary line network and the second passage to fuel the dual-fuel turbine engine. The dual-fuel turbine engine is switched from the liquid fuel to gaseous fuel. Purging fluid flows through the first passage while the dual-fuel turbine engine is fueled with the gaseous fuel from the gaseous fuel intake system via the third passage.

Flowing the purging fluid through the first passage can occur continuously while fueling the dual-fuel turbine engine with the gaseous fuel. The purging fluid can flow to the first passage via a cross fitting coupled to a first primary line and a second primary line of the primary line network. The purging fluid can flow through the second passage while fueling the dual-fuel turbine engine with the gaseous fuel.

The purging fluid can flow through the first passage and the second passage simultaneously. The purging fluid can flow through the first passage and the second passage at different flow rates and/or different flow pressures while fueling the dual-fuel turbine engine with the gaseous fuel. A first portion of the purging fluid can flow to the primary line network via a first fitting and a second portion of the purging fluid can flow to the secondary line network via a second fitting while fueling the dual-fuel turbine engine with the gaseous fuel.

In yet another aspect, a dual-fuel turbine engine can include a fuel manifold, a cold fuel nozzle, a liquid fuel intake system, a gaseous fuel intake system, and a purge system. In operation, the fuel manifold combusts liquid fuel or gaseous fuel. The cold fuel nozzle, which is in fluid communication with the fuel manifold, supplies the liquid fuel or the gaseous fuel to the fuel manifold. The liquid fuel intake system, which is in fluid communication with the cold fuel nozzle, supplies a first portion of the liquid fuel to the fuel manifold via a first passage of the cold fuel nozzle for start-up of the dual-fuel turbine engine and a second portion of the liquid fuel to the fuel manifold via a second passage of the cold fuel nozzle for powering the dual-fuel turbine engine. The gaseous fuel intake system, which is in fluid communication with the cold fuel nozzle, supplies the gaseous fuel to the fuel manifold via a third passage of the cold fuel nozzle. And the purge system, which is in fluid communication with the cold fuel nozzle, purges the first and second passages of the cold fuel nozzle with purging fluid while the gaseous fuel intake system supplies the gaseous fuel to the fuel manifold via the third passage of the cold fuel nozzle.

The purge system can include a valve configured to connect to a purge source and a switch, operably coupled to the valve, to actuate the valve in response to a signal from a control system of the dual-fuel turbine engine. The purge system can be configured to flow purging fluid through the first and second passages at different flow rates and/or different flow pressures while the gaseous fuel intake system supplies the gaseous fuel to the fuel manifold via the third passage of the cold fuel nozzle. The purge system can be configured to flow purging fluid through the first and second passages continuously while the gaseous fuel intake system supplies the gaseous fuel to the fuel manifold via the third passage of the cold fuel nozzle. The purge system can be coupled to different lines of the liquid fuel intake system via a four-port fitting.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
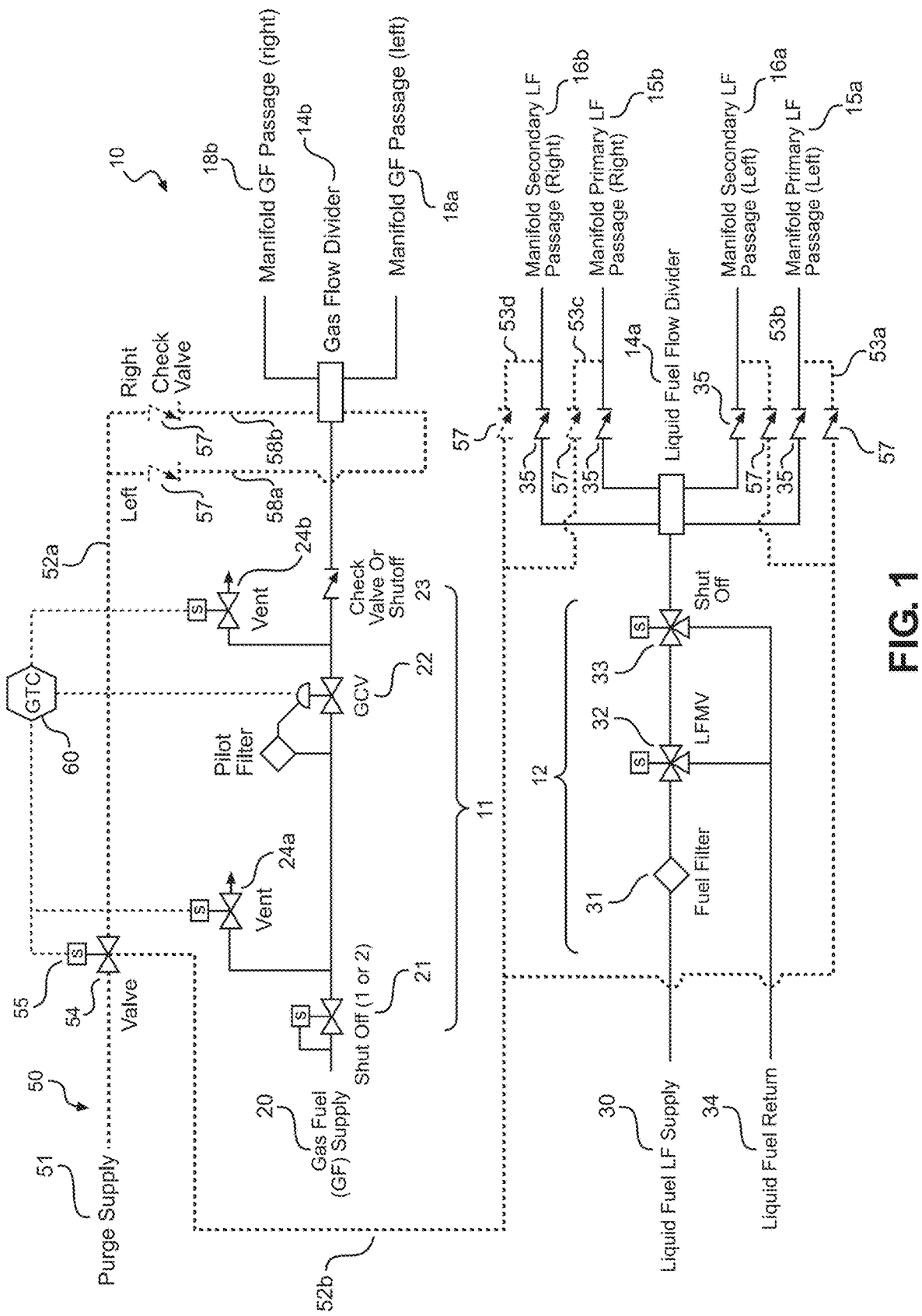
FIG. 1 shows a flow schematic for an example dual-fuel turbine engine with a purge system that purges a primary line and a secondary line carrying liquid fuel and a gas line carrying gas fuel.

Following below are more detailed descriptions of various concepts related to, and implementations of, a dual-fuel turbine engine and, in particular, a purge system to purge at least a primary line and corresponding passages of one or more fuel nozzles connected to the primary line in the dual-fuel turbine engine. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive purge systems for dual-fuel turbine engines are provided, wherein a given example or set of examples showcases one or more particular features of fittings, piping, and/or tubing of the purge system fluidically coupled to a primary line network and/or a secondary line network. It should be appreciated that one or more features discussed in connection with a given example of a purge system may be employed in other examples of purge systems according to the present disclosure, such that the various features disclosed herein may be readily combined in a given purge system according to the present disclosure (provided that respective features are not mutually inconsistent).

Certain dimensions and features of the dual-fuel turbine engine and, in particular, the purge system are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

The purge systems disclosed herein are generally implemented in dual-fuel turbine engines that operate using a liquid fuel (e.g., diesel) and natural gas. However, it should be appreciated the various concepts and features of the purge systems may be applied to dual-fuel turbine engines that use other types of fuel, such as liquified petroleum gas, kerosene, or syngas. Moreover, the various concepts and features of the purge systems may also be applied to other fuel flexible turbine engines that operate using more than two types of fuels.

1. EXAMPLE PURGE SYSTEMS FOR PRIMARY AND SECONDARY LINES

The purge systems disclosed herein may generally purge and seal portions of a primary line carrying liquid fuel and the corresponding passage(s) in each fuel nozzle connected to the primary line (e.g., the primary line passages). The purge systems may also purge and seal portions of a secondary line carrying the same liquid fuel and the corresponding passage(s) connected to the secondary lines (also referred to herein as "secondary line passages") in each fuel nozzle. By fluidically coupling the purge system to both the primary and secondary lines, the number of components used to purge and seal the primary and secondary lines may be appreciably reduced compared to turbine engines with separate purge systems for the primary and secondary lines, thus reducing cost, complexity, size, and weight and improving reliability.

FIG. 1 shows a flow schematic for an example dual-fuel turbine engine 10 with a purge system 50 configured to purge primary lines and secondary lines carrying liquid fuel and/or gas lines carrying gas fuel. As shown, the turbine engine 10 includes a gaseous fuel intake system 11 and a liquid fuel intake system 12, which respectively provide gaseous fuel (e.g., natural gas, syngas) and liquid fuel (e.g., diesel, Jet-A) to the turbine engine 10. The gaseous fuel intake system 11 and the liquid fuel intake system 12 are fluidically coupled to one (or more) fuel manifolds (not shown) with each fuel manifold supporting multiple fuel nozzles to inject gas fuel and/or liquid fuel into a combustion chamber (not shown) for combustion during operation of the turbine engine 10. The fuel nozzles may be cold fuel nozzles. More generally, the fuel nozzles may be any type of fuel nozzle exposed to the hot gases produced within the combustion chamber and, hence, prone to coking.

When gas fuel is used for combustion, the gaseous fuel intake system 11 first receives a flow of gas fuel from a gas fuel supply 20. The gas fuel supply 20 may include a pipeline supplying gas or a reservoir (e.g., an underground reservoir) or multiple containers to store gas fuel and pump(s) to facilitate a flow of gas fuel to the turbine engine 10. The gas fuel thereafter flows through a shut off valve 21, a gas control valve 22, and a check valve 23. The shut off valve 21 is open when gas fuel is used and closed when liquid fuel is used. The gas control valve 22 controls a flow rate of gas fuel. The check valve 23 is a type of valve that allows fluid to flow in only one direction. Thus, the check valve 23 may prevent unwanted back flow of gas or other fluids towards the gas supply 20. FIG. 1 further shows the gaseous fuel intake system 11 may include valves 24a and 24b to facilitate venting of the gas lines in the gaseous fuel intake system 11, e.g., when liquid fuel is used for combustion.

The gas fuel then flows to a flow divider 14b, which divides the flow of gas fuel between gas lines 18a and 18b directed to different fuel manifolds, each of which may have multiple fuel nozzles. Thereafter, the gas fuel flows to each fuel nozzle in each fuel manifold for injection into the combustion chamber. The gas lines 18a and 18b are non-limiting examples. More generally, the turbine engine 10 may include a single gas line for a single fuel manifold, multiple gas lines for a single fuel manifold, or gas lines for three or more fuel manifolds.

When liquid fuel is used for combustion, the liquid fuel intake system 12 first receives a flow of liquid fuel from a liquid fuel supply 30. The liquid fuel supply 20 may include multiple tanks to store liquid fuel and pump(s) to facilitate a flow of liquid fuel to the turbine engine 10. The liquid fuel thereafter flows through a fuel filter 31, a liquid fuel metering valve 32, and a shutoff valve 33. The fuel filter 31 removes undesirable contaminants in the liquid fuel. The liquid fuel metering valve 32 provides a regulated flow of liquid fuel to the turbine engine 10. As shown in FIG. 1, the liquid fuel metering valve 32 may be a three-way valve fluidically coupled to the liquid fuel supply 30, the shut off valve 33, and a liquid fuel return line 34 to carry excess liquid fuel back to the liquid fuel supply 30. The shut off valve 33 is open when liquid fuel is used and closed when gas fuel is used.

Thereafter, the liquid fuel flows to a flow divider 14a, which divides the flow of liquid fuel between primary lines 15a and 15b and secondary lines 16a and 16b. The primary lines 15a and 15b supply liquid fuel to facilitate startup of the turbine engine 10 and the secondary lines 16a and 16b supply liquid fuel to adjust the power output of the turbine engine 10. During operation, liquid fuel may continue to flow through the primary lines 15a and 15b to cool the fuel manifold(s) and/or the fuel nozzle(s). In this example, the primary line 15a and the secondary line 16a (and/or the primary line 15b and the secondary line 16b) may carry liquid fuel to the same fuel manifold. However, the primary line 15a and the secondary line 16a may nevertheless supply liquid fuel to separate fuel lines within the fuel manifold fluidically coupled to different passages in each fuel nozzle supported by that fuel manifold for injection into the combustion chamber. (Purging the primary lines 15a and 15b while flowing liquid fuel through the secondary lines 16a and 16b could lead to flame extinction.)

Moreover, the gas line 18a (and/or the gas line 18b) can further fluidically carry gas fuel to the same fuel manifold as the primary and secondary lines. The primary lines 15a and 15b and the secondary lines 16a and 16b are non-limiting examples. More generally, the turbine engine 10 may include one primary line and one secondary line for a single fuel manifold, multiple primary lines and/or multiple secondary lines for a single fuel manifold, or primary and secondary lines for three or more fuel manifolds.

The purge system 50 may be fluidically coupled to the primary lines 15a and 15b, secondary lines 16a and 16b, and gas lines 18a and 18b as shown in FIG. 1. Thus, depending on whether liquid fuel or gas fuel is used, the purge system 50 can (1) vent the primary lines 15a and 15b, secondary lines 16a and 16b, and/or gas lines 18a and 18b by providing a flow of air or other purging fluid to purge the lines of liquid fuel or gas fuel or (2) seal the primary lines 15a and 15b, secondary lines 16a and 16b, and/or gas lines 18a and 18b by providing a continuous flow of air to prevent hot combustion gases in the combustion chamber from flowing into the fuel nozzle when the lines aren't carrying fuel. Generally, the purge system 50 may supply various purging fluids including, but not limited to, air and water.

As shown in FIG. 1, the purge system 50 receives purging fluid from a purge supply 51. The purge supply 51 may include multiple tanks to store the purging fluid and pump(s) to facilitate a flow of purging fluid to the turbine engine 10. Once the purge system 50 receives the purging fluid from the purge supply 51, the purging fluid flows towards a valve 54. The valve 54 may be a three-way valve that controls the flow of purging fluid to either the gas lines 18a and 18b via a purge line 52a or the primary lines 15a and 15b and secondary lines 16a and 16b via a purge line 52b. The valve 54 can further include a switch 55 communicatively coupled to a gas turbine control system 60, which controls operation of the turbine engine 10 including whether to flow purging fluid to the purge line 52a or the purge line 52b. The gas turbine control system 60 also controls the liquid fuel supply 30, e.g., by actuating the liquid fuel metering valve 32 and/or the shut off valve 33.

The purge line 52a may be fluidically coupled to the flow divider 14b. For example, FIG. 1 shows the purge line 52a may divide into purge lines 58a and 58b that flow into different ports on the flow divider 14b. Each line further includes a check valve 57 to prevent unwanted back flow of purging fluid or other fluids towards the valve 54 through the purge line 52a. Thus, when the purging fluid flows through the purge line 52a, the purging fluid vents and/or seals the flow divider 14b, the gas lines 18a and 18b, gas lines within the fuel manifold(s) that carry gas fuel, and passages in each fuel nozzle that carry gas fuel.

The purge line 52b may divide into multiple purge lines 53a, 53b, 53c, and 53d that are fluidically coupled to the primary line 15a, the secondary line 16a, the primary line 15b, and the secondary line 16b, respectively. Thus, the purge line 52b vents and/or seals the primary lines 15a and 15b, the secondary lines 16a and 16b, fuel lines within the fuel manifold(s) that carry liquid fuel, and passages in each fuel nozzle that carry liquid fuel. Each of the purge lines 53a, 53b, 53c, and 53d may further include a check valve 57 to prevent unwanted back flow of purging fluid or other fluids towards the valve 54 through the purge line 52b. Furthermore, each of the primary lines 15a and 15b and the secondary lines 16a and 16b may include a check valve 35 to prevent unwanted back flow of liquid fuel or purging fluid towards the flow divider 14a.

It should be appreciated the flow schematic of FIG. 1 is a non-limiting example. In other examples, the purge line 52a may be fluidically coupled directly to the gas lines 18a and 18b and not the flow divider 14b. In other examples, the purge line 52b may be fluidically coupled directly to the flow divider 14a instead of the primary lines 15a and 15b and secondary lines 16a and 16b.

The purge lines 52a and 52b may also each include a shutoff valve (not shown) to reduce the likelihood of purging fluid flowing into gas fuel lines or liquid fuel lines actively carrying gas fuel or liquid fuel, respectively. The shutoff valves may further be electronically controllable and communicatively coupled to the gas turbine control system 60 such that the gas turbine control system 60 may electrically open or close the shutoff valve depending on whether gas fuel or liquid fuel is being used for combustion. For example, the shutoff valves can be 24 VDC solenoid valves.

The purge system 50 may generally receive purging fluid at a nominal fluid pressure and/or flow rate to the purge system 50 regardless of whether the purging fluid is used to seal or vent the primary lines 15a and 15b, secondary lines 16a and 16b, or gas lines 18a and 18b. Moreover, the purge system 50 may receive purging fluid via a single input connection with the purge supply 51. These aspects combine to improve ease of deployment of the turbine engine 10, particularly when the turbine engine 10 is installed on a mobile platform for transport to different locations that each have a purge supply 51. The fluid pressure and/or the flow rate may generally vary depending on the purging fluid used. In examples where the purging fluid is air, the fluid pressure may range between about 200 psig and about 250 psig where psig is gauge pressure expressed in pounds per square inch. The flow rate of air received by the purge system 50 may be equal to or greater than about 3 Standard Cubic Feet per Minute (SCFM).

Although the purge system 50 may receive purging fluid at a nominal fluid pressure and/or flow rate, the fluid pressure and/or flow rate of the purging fluid through each of the purge line 52a, the purge line 52b, the purge lines 58a and 58b, the purge lines 53a-53d, the primary lines 15a and 15b, the secondary lines 16a and 16b, and the gas lines 18a and 18b may be different. This may be due to differences in the dimensions (e.g., diameter, length) of the tubing or piping for each purge line, gas line, primary line, or secondary line and due to differences in the flow areas of the respective fuel nozzles. Additionally, the various purge lines, gas lines, primary lines, and/or secondary lines may include various fluidic components to modify the fluid pressure and/or flow rate as desired, such as a valve, a reducer, a tee fitting, or a cross fitting.

In the following, several example examples of dual-fuel turbine engines are disclosed with purge systems configured to vent and/or seal primary lines, secondary lines, and/or gas lines in the manner described above with respect to the turbine engine 10.

2. AN EXAMPLE OF A PURGE SYSTEM WITH A CROSS FITTING

Figure 2A:
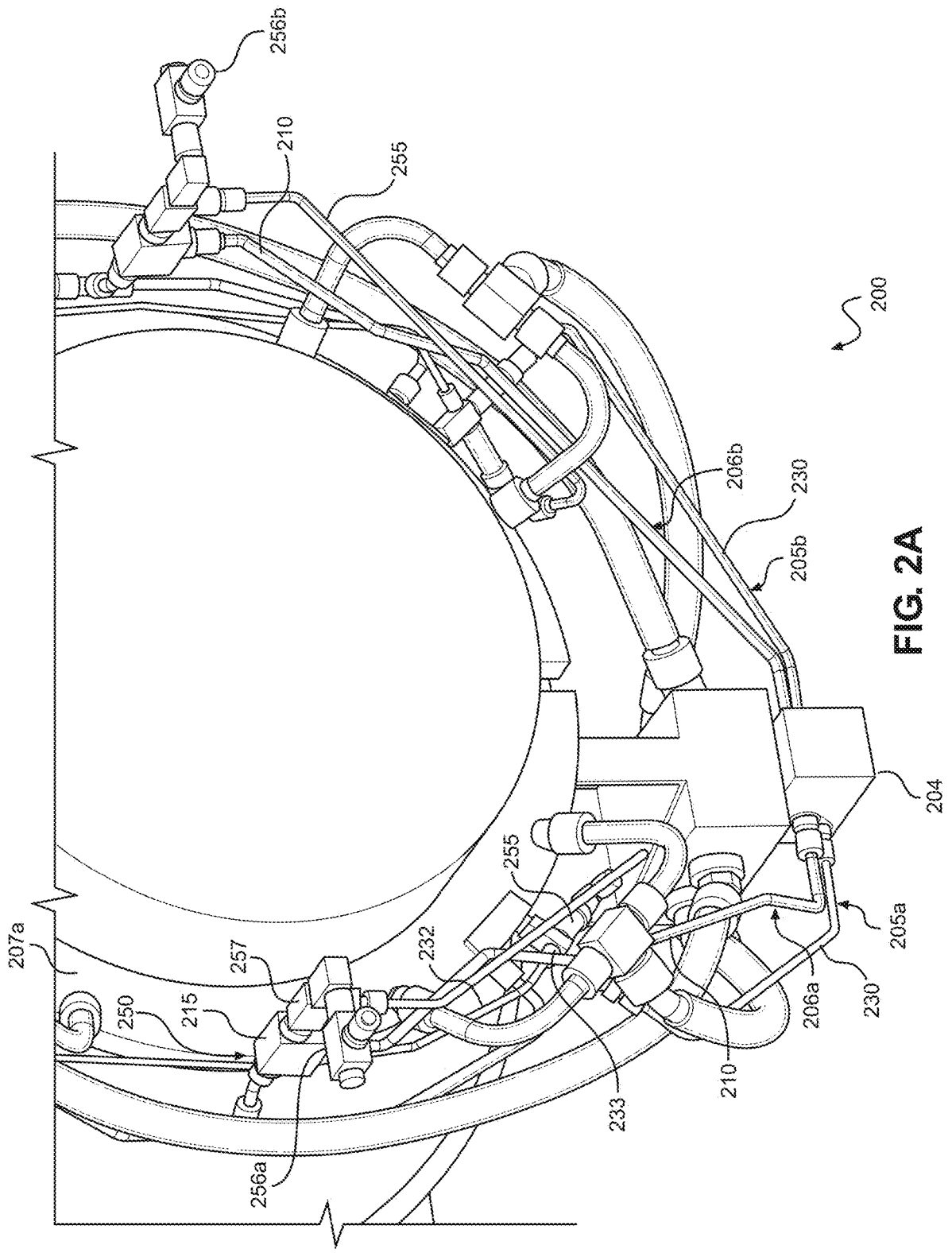
FIG. 2A shows a top, front, left perspective view of another example dual-fuel turbine engine with a purge system having a cross fitting in the primary line network.
Figure 2B:
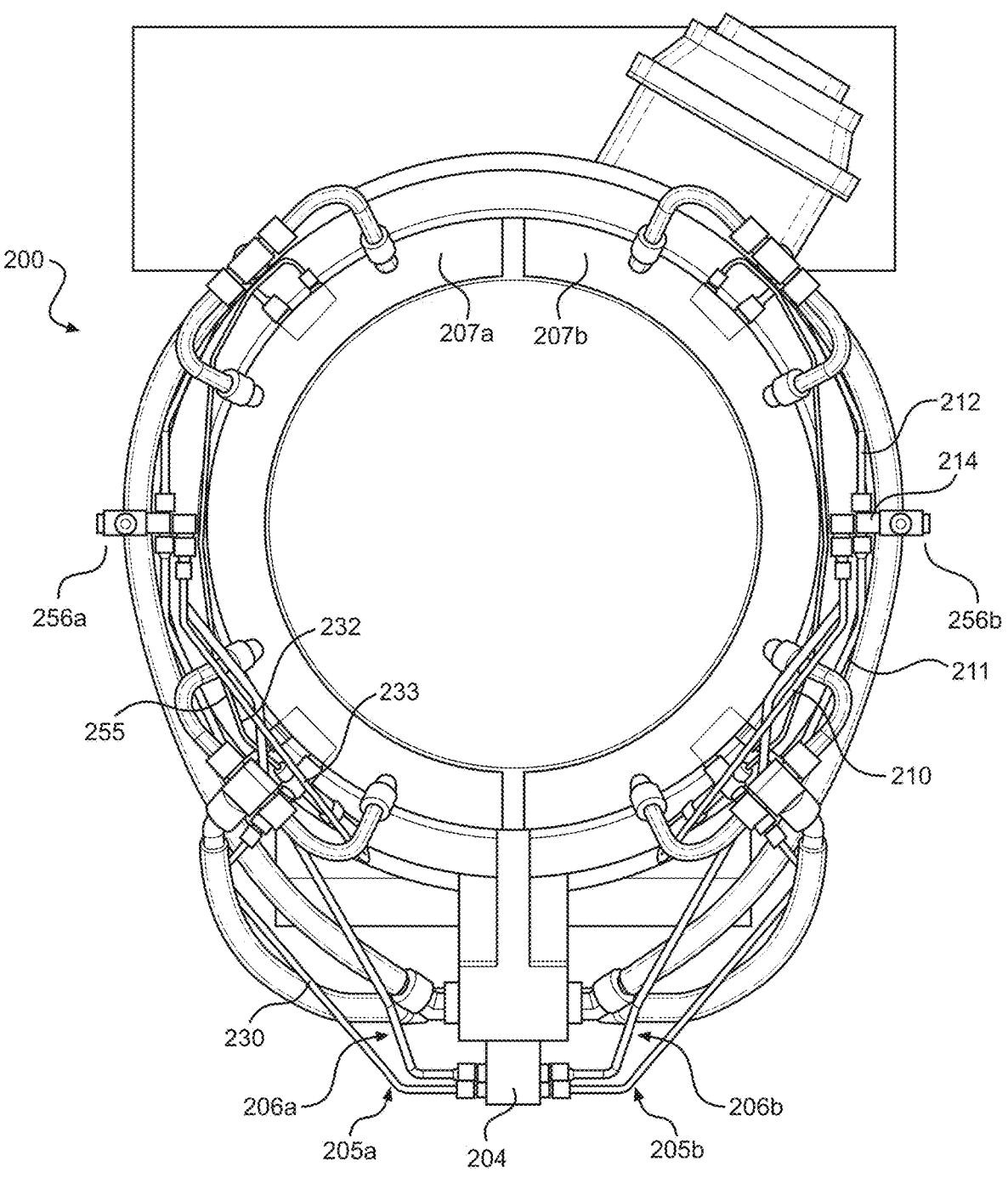
FIG. 2B shows a front view of the dual-fuel turbine engine of FIG. 2A.
Figure 2C:
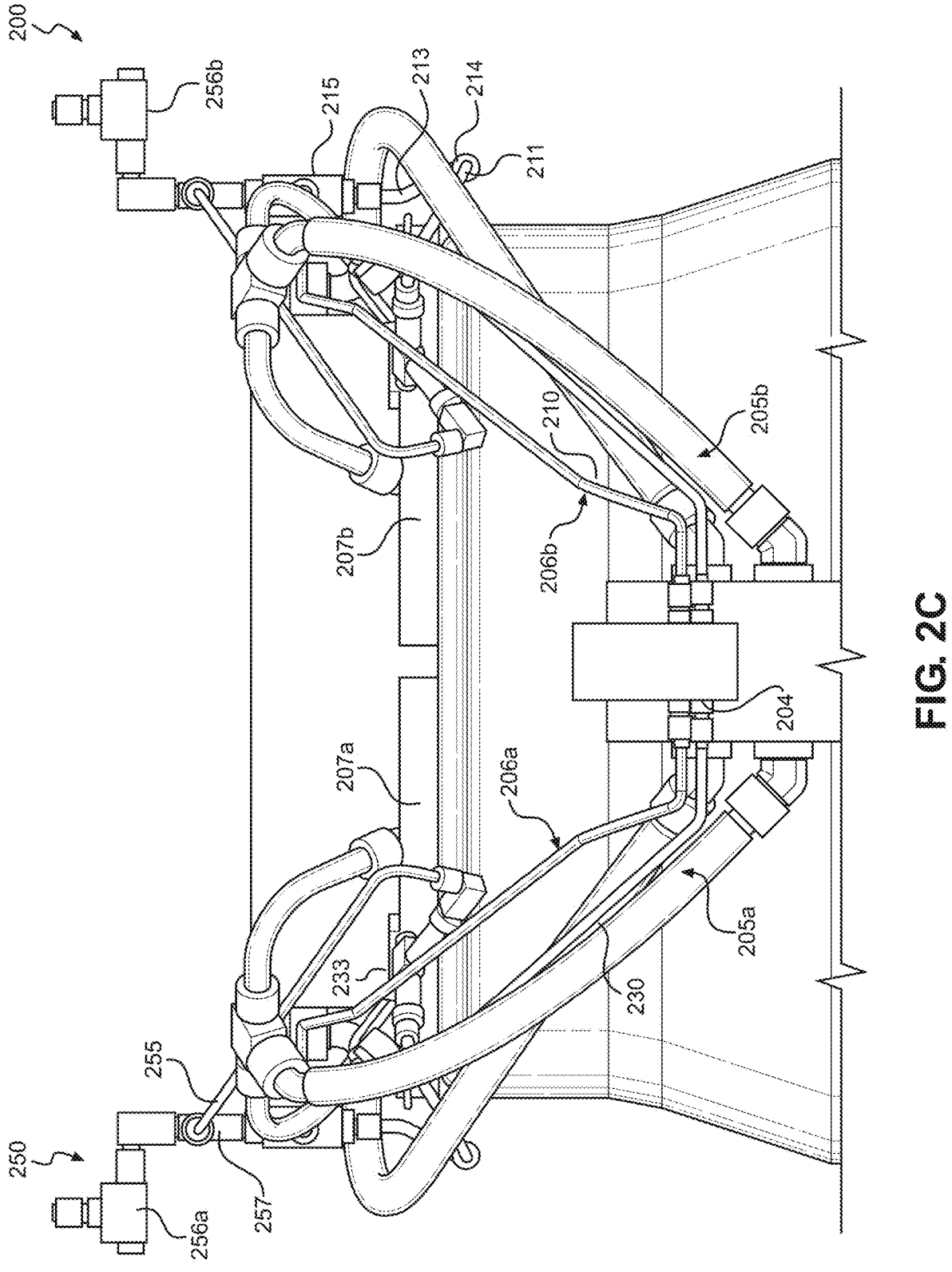
FIG. 2C shows a bottom view of the dual-fuel turbine engine of FIG. 2A.

FIGS. 2A-2C show an example assembly of a dual-fuel turbine engine 10 with a purge system 250. As shown, the turbine engine 200 includes a flow divider 204 coupled to a liquid fuel intake system (not shown). The flow divider 204 divides a flow of liquid fuel between primary line networks 205a and 205b and secondary line networks 206a and 206b. The primary line network 205a and the secondary line network 206a are fluidically coupled to a fuel manifold 207a and the primary line network 205b and the secondary line network 206b are fluidically coupled to a fuel manifold 207b.

Each of the primary line networks 205a and 205b includes a primary line 230 fluidically coupled to the flow divider 204 and a fitting 233. The fitting 233 includes one port fluidically coupled directly to the fuel manifold 207a and another port fluidically coupled to another primary line 232. The primary line 232, in turn, is fluidically coupled directly to the fuel manifold 207a. Each of the secondary line networks 206a and 206b includes a secondary line 210 fluidically coupled to the flow divider 204 and a fitting 215. The fitting 215 is then fluidically coupled to a fitting 214 via a secondary line 213. The fitting 214 divides a flow of liquid fuel between secondary lines 211 and 212, which in turn are fluidically coupled directly to the fuel manifold 207a.

The purge system 250 includes a fitting 256a to receive a purging fluid from a purge source (not shown) and to supply the purging fluid to the primary line network 205a, the secondary line network 206a, the fuel manifold 207a, and the fuel nozzles (not shown) supported by the fuel manifold 207a. The fitting 256a is fluidically coupled to a fitting 257, which divides a flow of purging fluid between the fitting 215 for the secondary line network 206a and a purge line 255 for the primary line network 205a coupled to the fitting 233. The purge system 250 further includes a fitting 256b to receive and supply a purging fluid to the primary line network 205b, the secondary line network 206b, the fuel manifold 207b, and the fuel nozzles (not shown) supported by the fuel manifold 207b using similar fittings and/or purge lines.

Figure 3A:
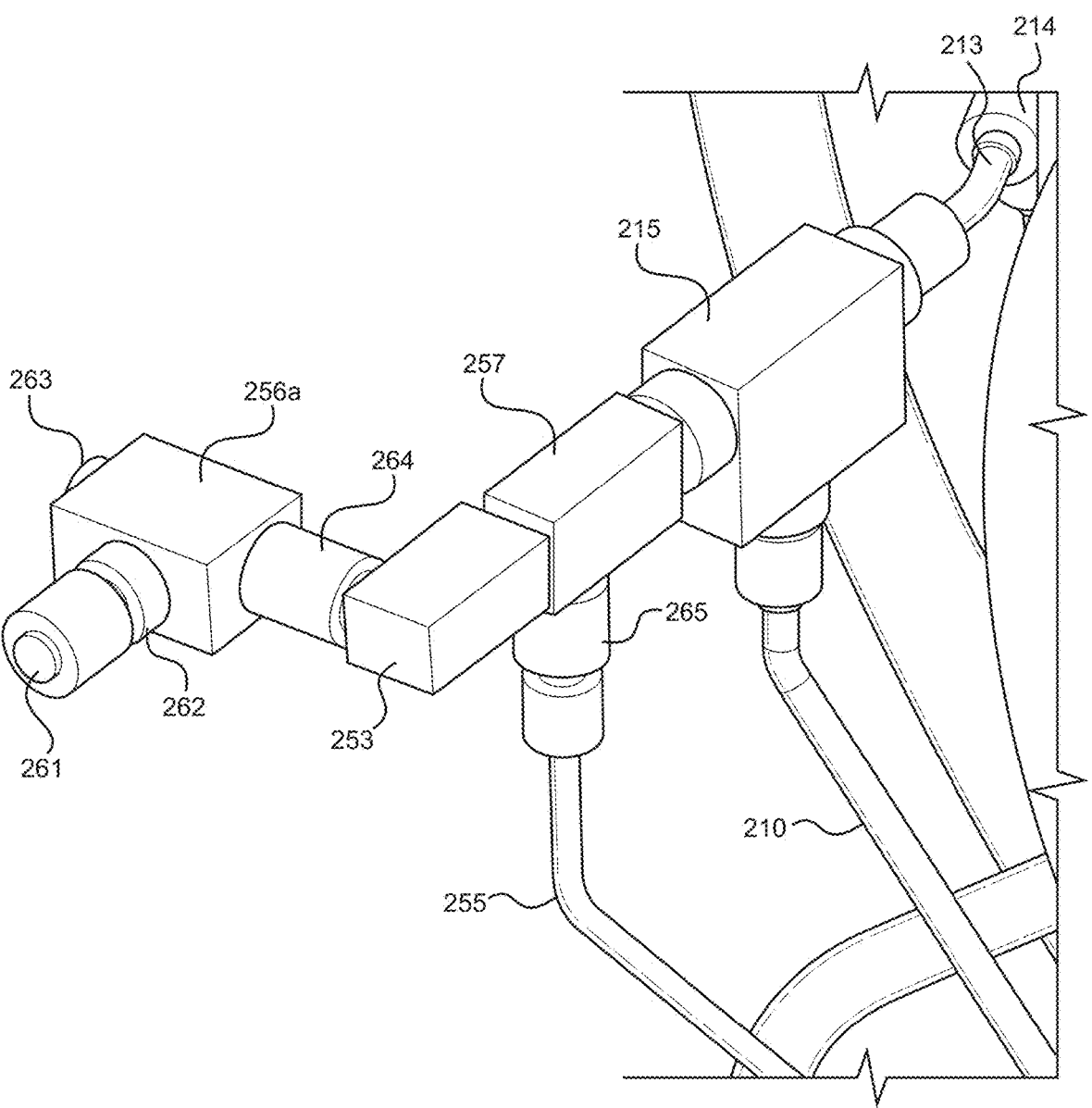
FIG. 3A shows a top, front, right perspective view of the tee fittings for the primary lines and the secondary lines in the purge system of FIG. 2A.

FIG. 3A shows a magnified view of the fittings 256a and 257 of the purge system 250 and their respective fluidic connections to the primary line network 205a and the secondary line network 206a. As shown, the fitting 256a may be a tee fitting having three ports. The fittings 257 and 215 may also each be tee fittings. A fitting end 261 may be fluidically coupled to one port of the fitting 256a via a connector 262. The fitting end 261 fluidically couples to a purge source (e.g., the purge line 51 of FIG. 1) to receive the purging fluid from the purge source. The fitting end 261 may be tailored to be compatible with conventional fluidic connections used with purge sources, which are typically provided by the end user as described above. A plug 263 may also be coupled to another port of the fitting 256a to seal the port. Lastly, the fitting 256a is fluidically coupled to the fitting 257 via a combination of a straight connector 264 and an elbow connector 253.

The flow rate and/or the pressure of the purging fluid flowing through the primary line network 205a and the secondary line network 206a and/or the fluidic connections between different sized tubing/piping may be achieved by using one or more reducers. A reducer is a fitting that fluidically couples respective pipes that differ in size. For example, FIG. 3A shows the fitting 257 includes a reducer 265 fluidically coupled to the purge line 255, which is smaller in size compared to the ports of the fitting 257.

Figures 3B, 3C:
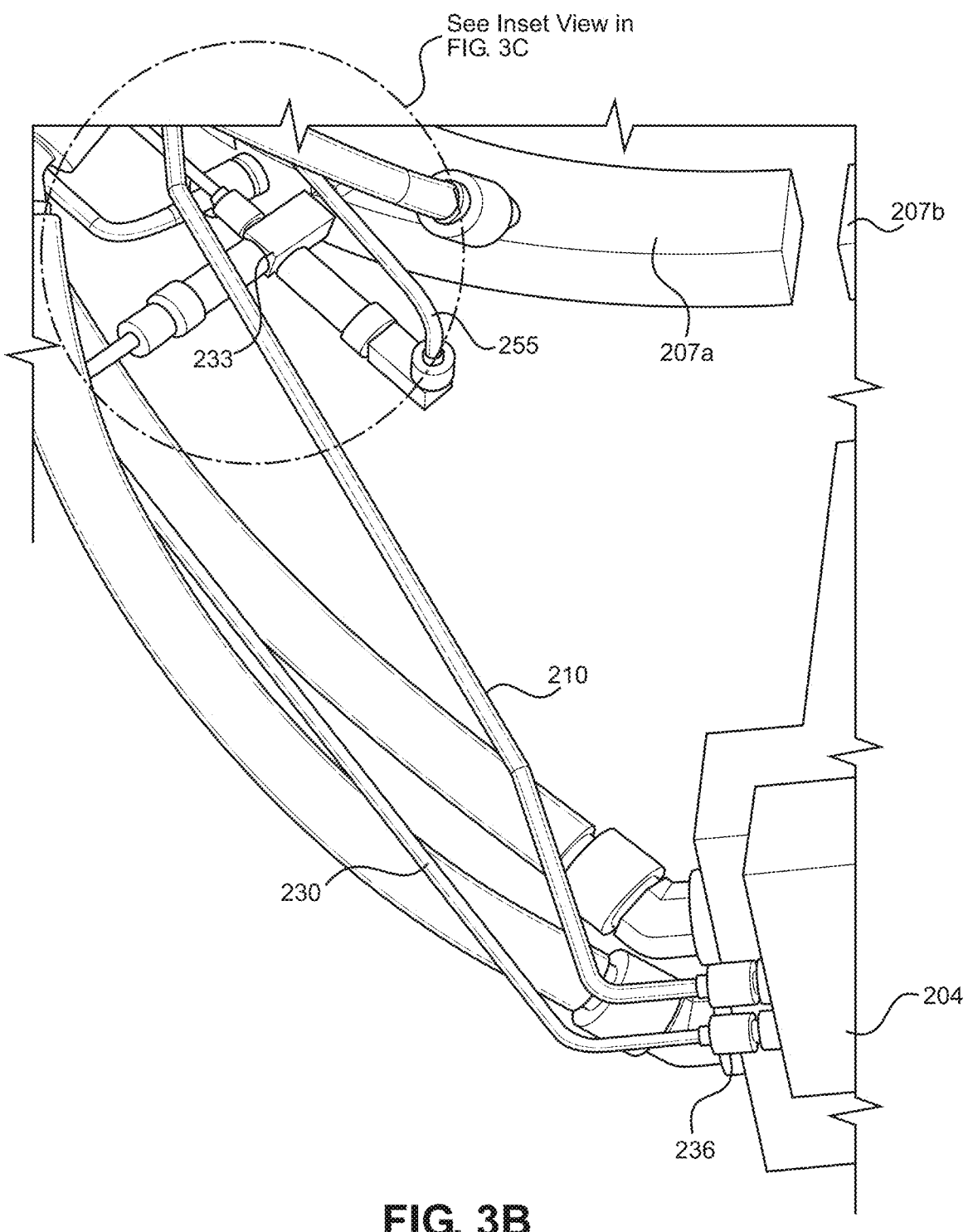
FIG. 3B shows a bottom, front, right perspective view of a portion of a primary line network in the dual-fuel turbine engine of FIG. 2A.
FIG. 3C is an enlarged view of FIG. 3B showing a cross fitting in the primary line network coupled to the purge system.
Figure 3C:
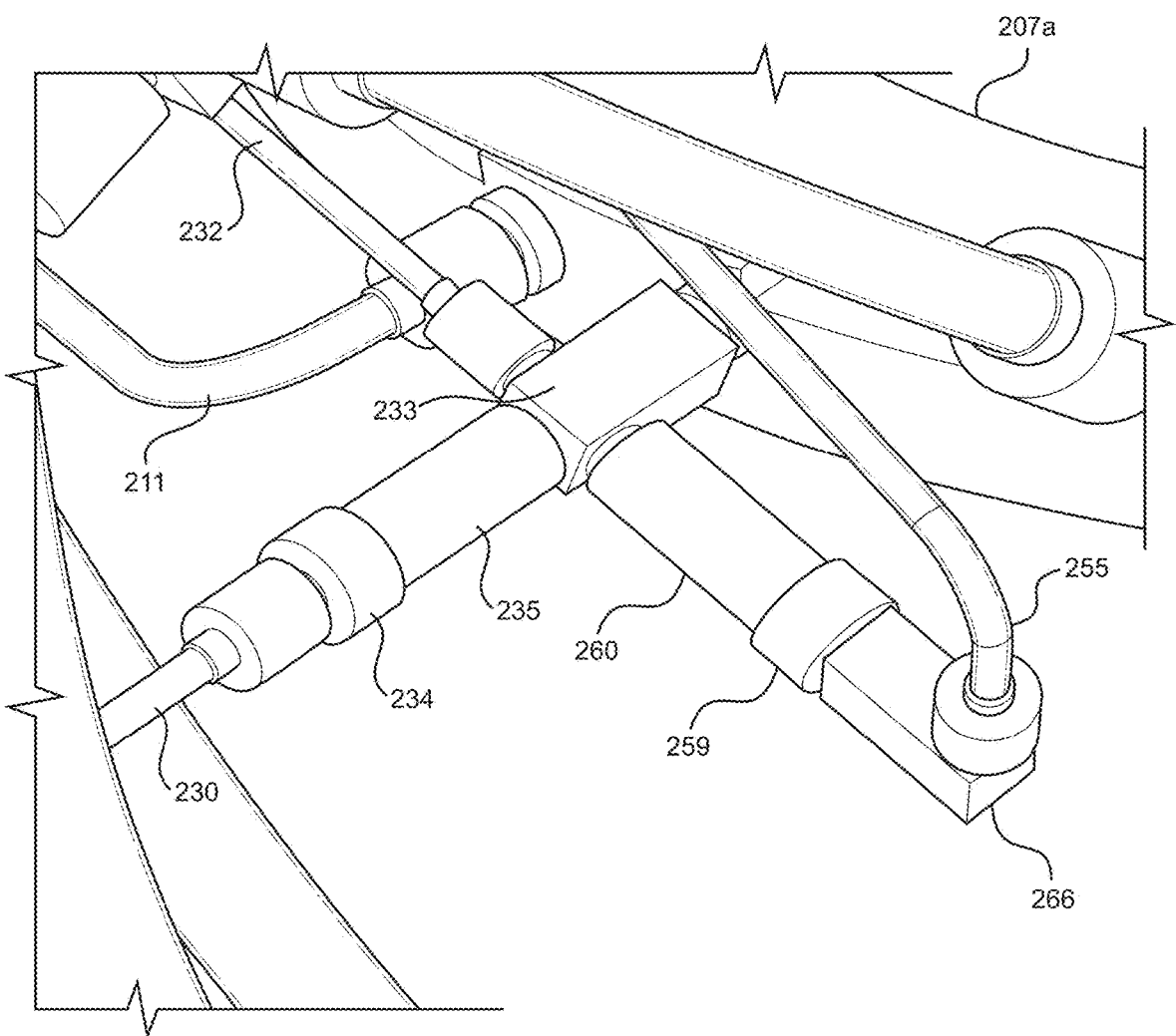
Figure 4A:
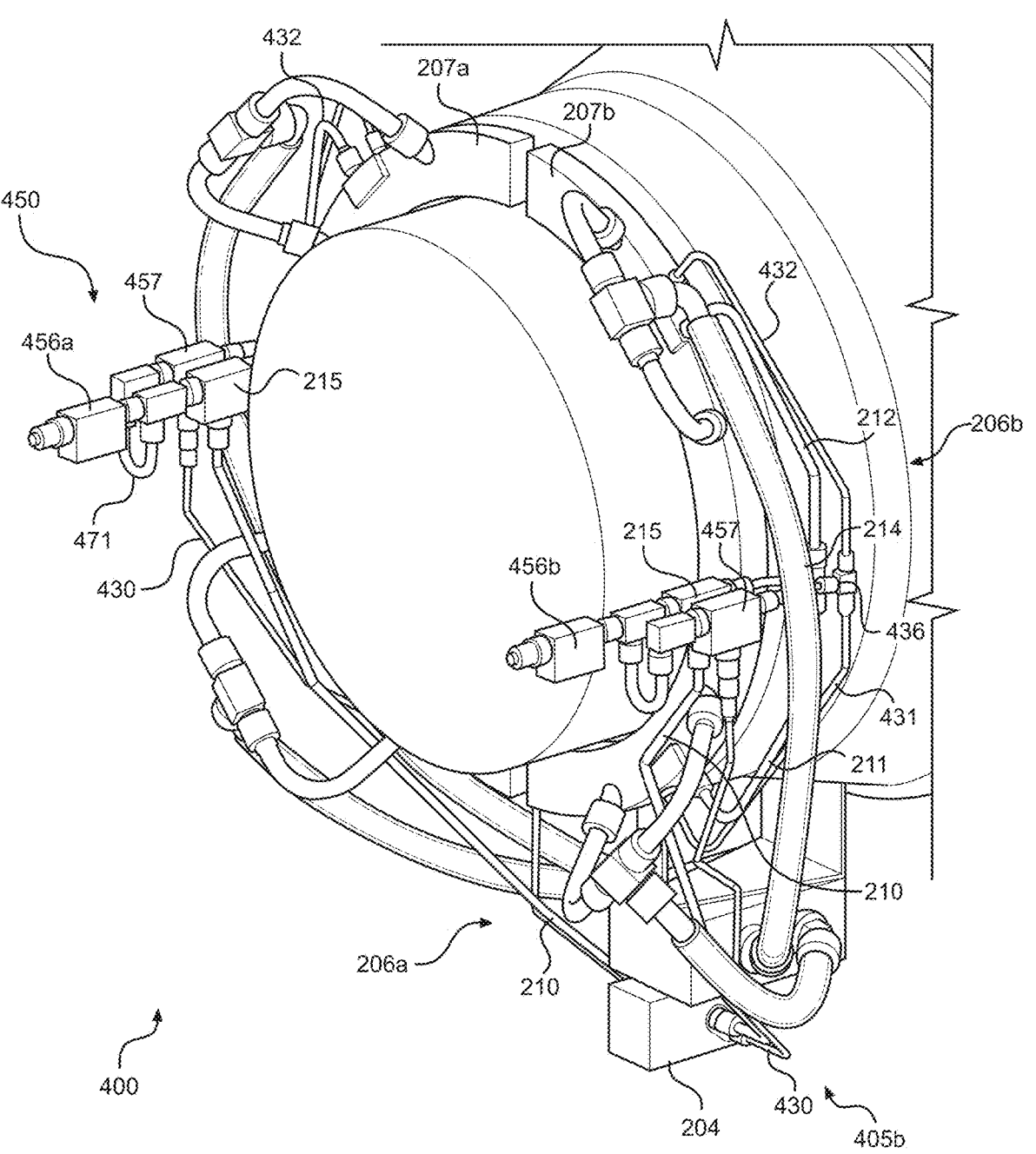
FIG. 4A shows a top, front, right perspective view of another example dual-fuel turbine engine with a purge system having a cross fitting for the primary line network.
Figure 4B:
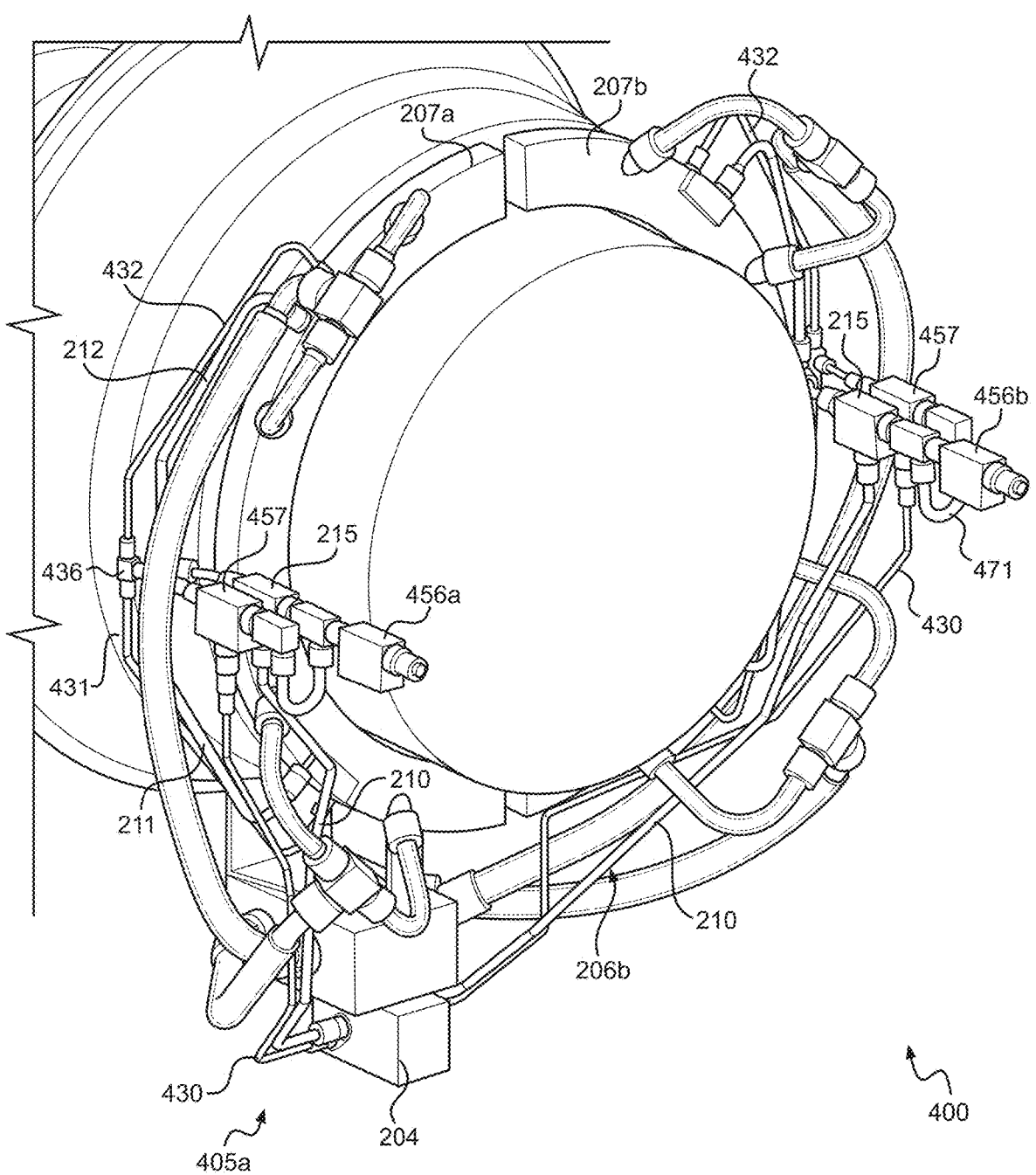
FIG. 4B shows a top, front, left perspective view of the dual-fuel turbine engine of FIG. 4A.
Figure 4C:
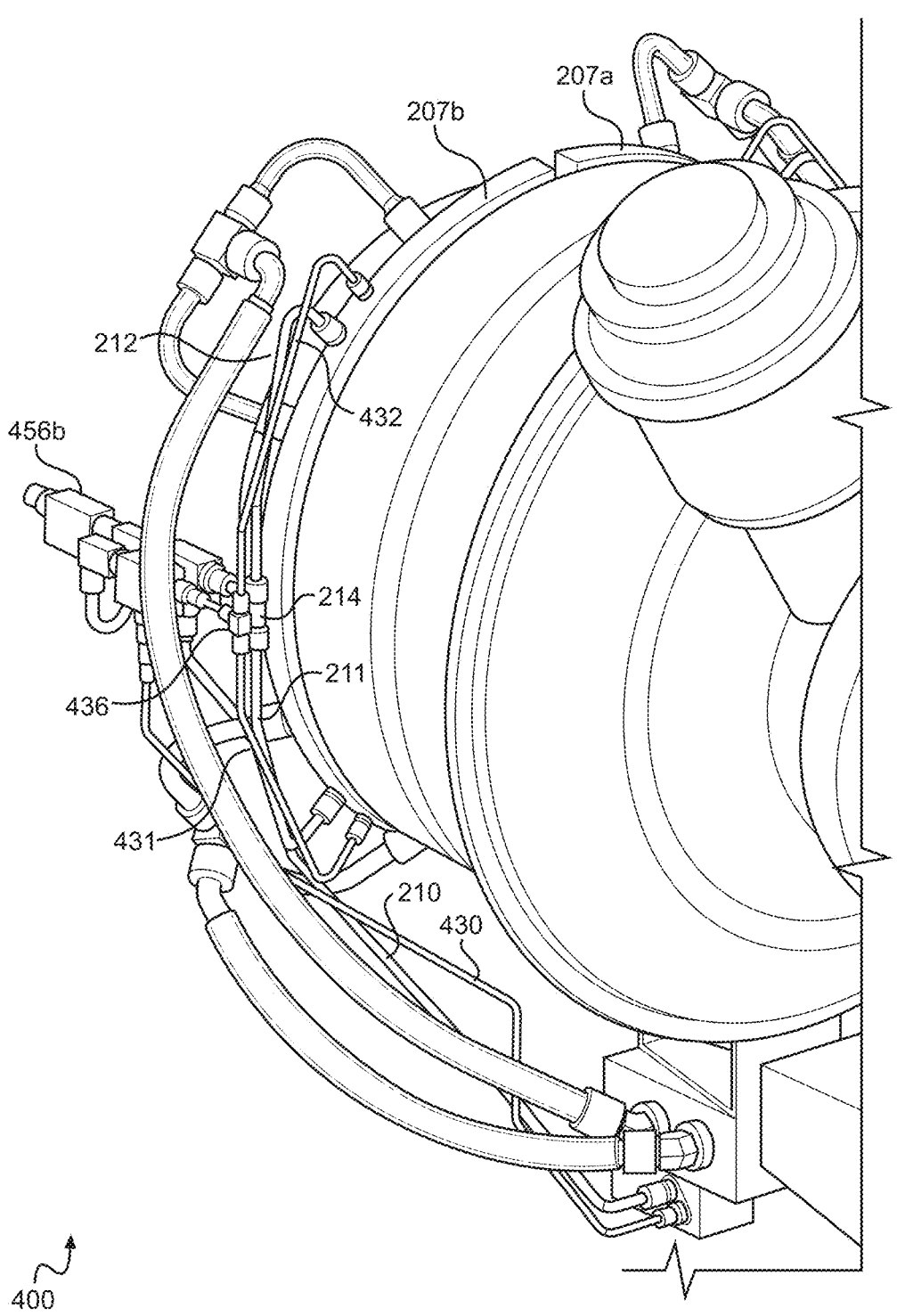
FIG. 4C shows a top, rear, right perspective view of the dual-fuel turbine engine of FIG. 4A.
Figure 4D:
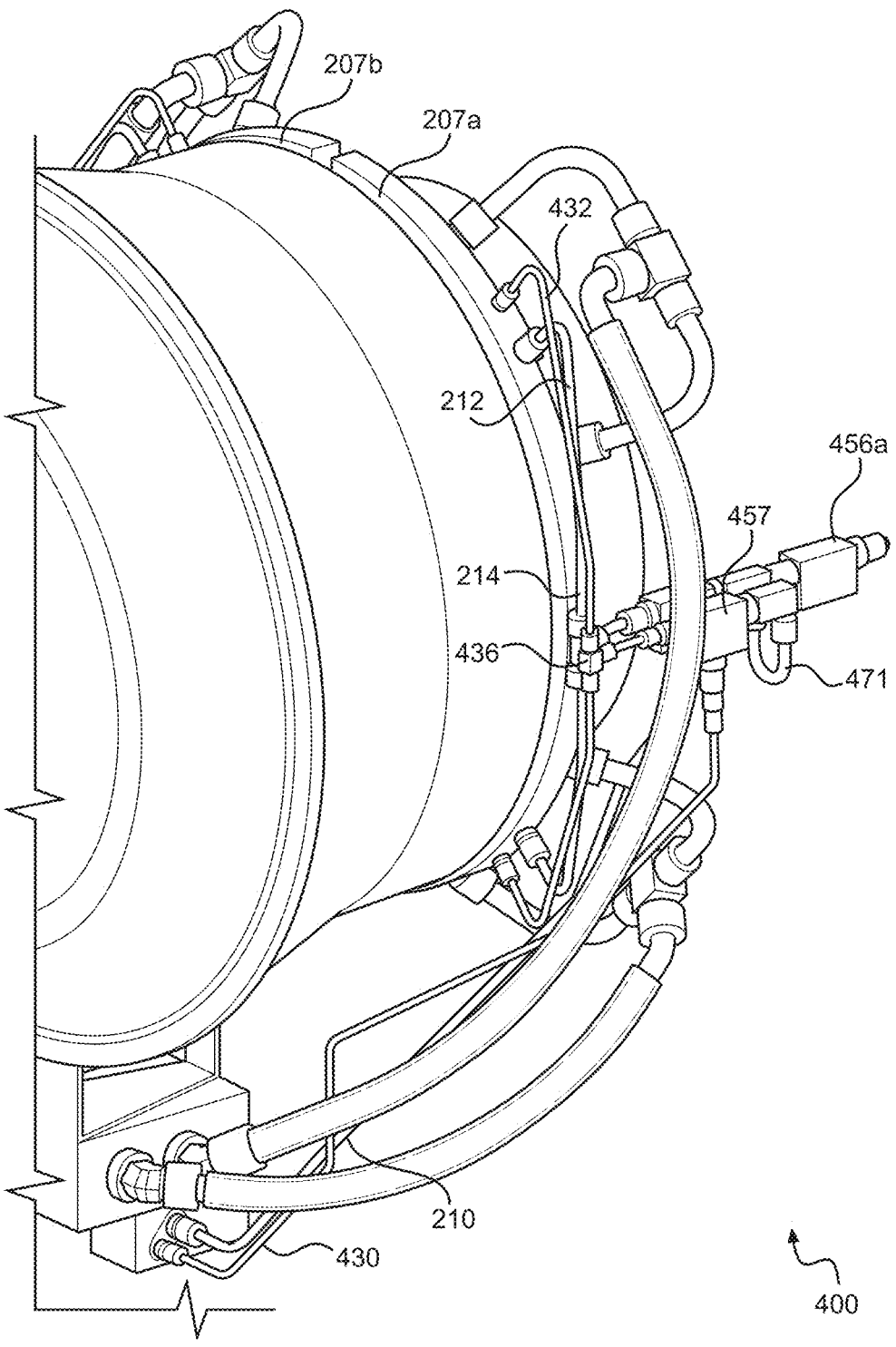
FIG. 4D shows a top, rear, left perspective view of the dual-fuel turbine engine of FIG. 4A.

FIG. 3B shows a magnified view of the primary and secondary line connections to the flow divider 204. As shown, the primary line 230 is also fluidically coupled to the flow divider 204 via a reducer 236. FIG. 3C further shows an inset view of FIG. 3B of the fitting 233, which may be a cross fitting with four ports. As shown, the primary line 230 is fluidically coupled to the fitting 233 via a check valve 234 and a reducer 235. Similarly, the purge line 255 is fluidically coupled to the fitting 233 via a check valve 259 and a reducer 260. The check valve 259 is shown coupled to the purge line 255 via an elbow connector 266. As described above, the check valves 234 and 259 prevent unwanted liquid fuel and/or purging fluid to flow back through the primary line 230 and the purge line 255, respectively.

It should be appreciated that the various fluidic connections described above may include one or more gaskets and/or O-rings to reduce or, in some instances, prevent unwanted leaks of purging fluid and liquid fuel. Furthermore, various off-the-shelf parts may be used in the assembly of the purge system 250.

3. AN EXAMPLE PURGE SYSTEM HAVING SIMILAR PRIMARY AND SECONDARY LINE NETWORKS

It should be appreciated that the purge systems 150a, 250, and 350 described above are non-limiting examples. In particular, purge systems with different arrangements of fittings, purge lines, and/or fluidic connections are also contemplated herein.

For example, FIGS. 4A-4D show another example assembly of a dual-fuel turbine engine 400 with primary line networks 405a and 405b with architectures similar to the architectures of the secondary line networks 206a and 206b. The turbine engine 400 further includes a purge system 450 fluidically coupled in parallel to respective fittings of the primary line network 405a (or 405b) and the secondary line network 206a (or 206b). As shown, the turbine engine 400 includes several of the same components as the turbine engine 200 described above. In particular, the turbine engine 400 includes the flow divider 204, the fuel manifolds 207a and 207b, and the secondary line networks 206a and 206b. For brevity, detailed discussions of the components and features shared with the turbine engine 200 are not repeated below.

Each of the primary line networks 405a and 405b includes a primary line 430 fluidically coupled to the fuel divider 204 and a tee fitting 457. The tee fitting 457, in turn, is fluidically coupled to a fitting 436 via a primary line 435. During operation, the fitting 436 divides a flow of liquid fuel or purging fluid between primary lines 431 and 432, which are directly coupled to the fuel manifold 207a or 207b. Thus, the primary line networks 405a and 405b are designed to have similar fluidic connections as the secondary line networks 206a and 206b, in particular, the secondary lines 210, 211, 212, and 213, the tee fitting 215, and the fitting 214.

The purge system 450 includes a pair of tee fittings 456a and 456b to receive a purging fluid from a purge source (not shown). Each of the tee fittings 456a and 456b is fluidically coupled to the fitting 215 for the secondary line network 206a or 206b via an intermediate tee fitting 472. The fitting 472, in turn, is fluidically coupled to the fitting 457 for the primary line network 405a or 405b via a connector tube 471 and an elbow connector 473. Thus, the purging fluid supplied by the fittings 456a or 456b is divided between the fittings 215 and 457. In other words, the fitting 215 is fluidically coupled in parallel with the fitting 457.

Figure 5A:
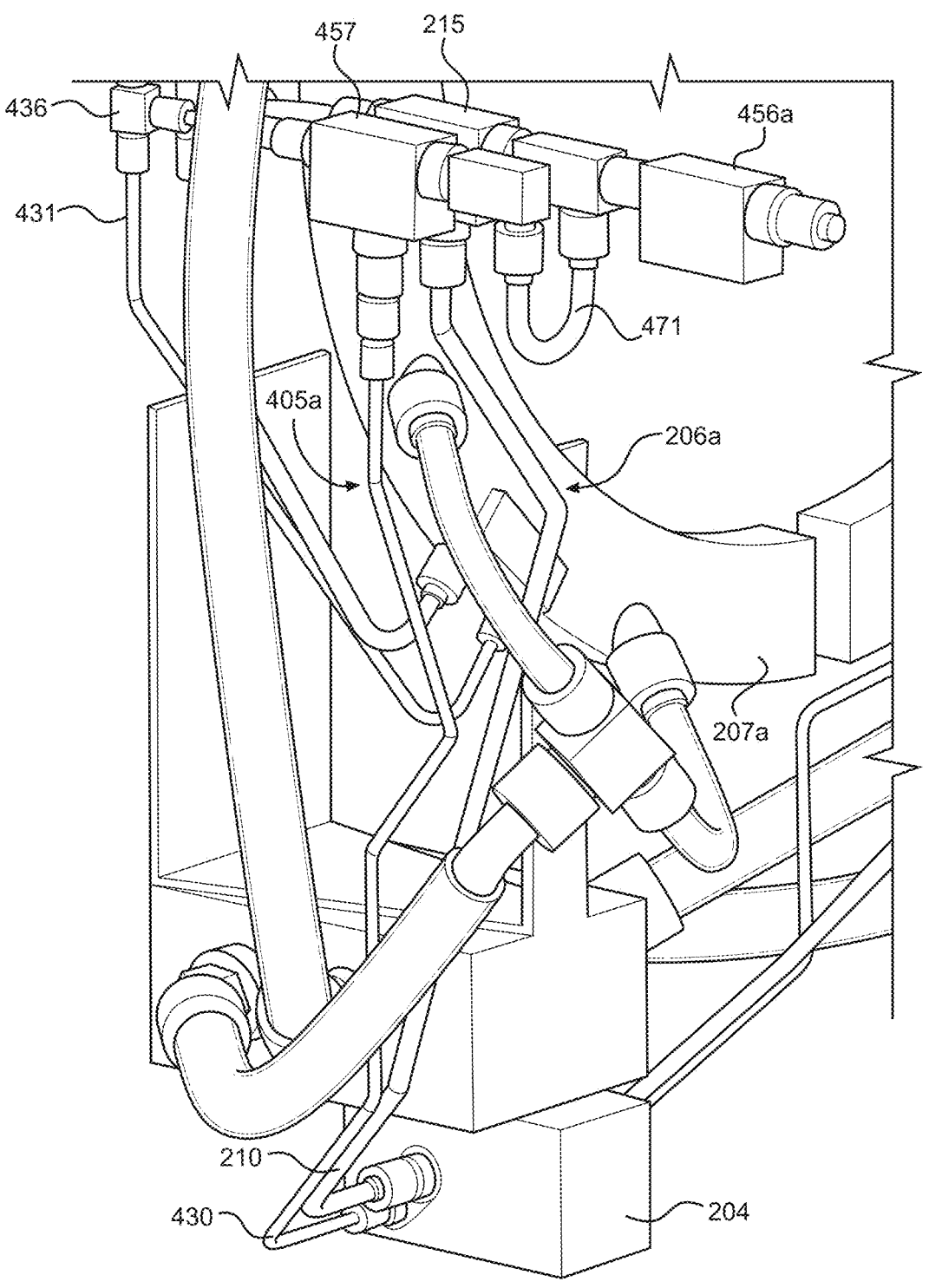
FIG. 5A shows a top, front, right perspective view of a portion of the purge system coupled to a primary line network and a secondary line network in the dual-fuel turbine engine of FIG. 4A. A portion of the turbine engine is hidden to show the fuel manifolds more clearly.
Figure 5B:
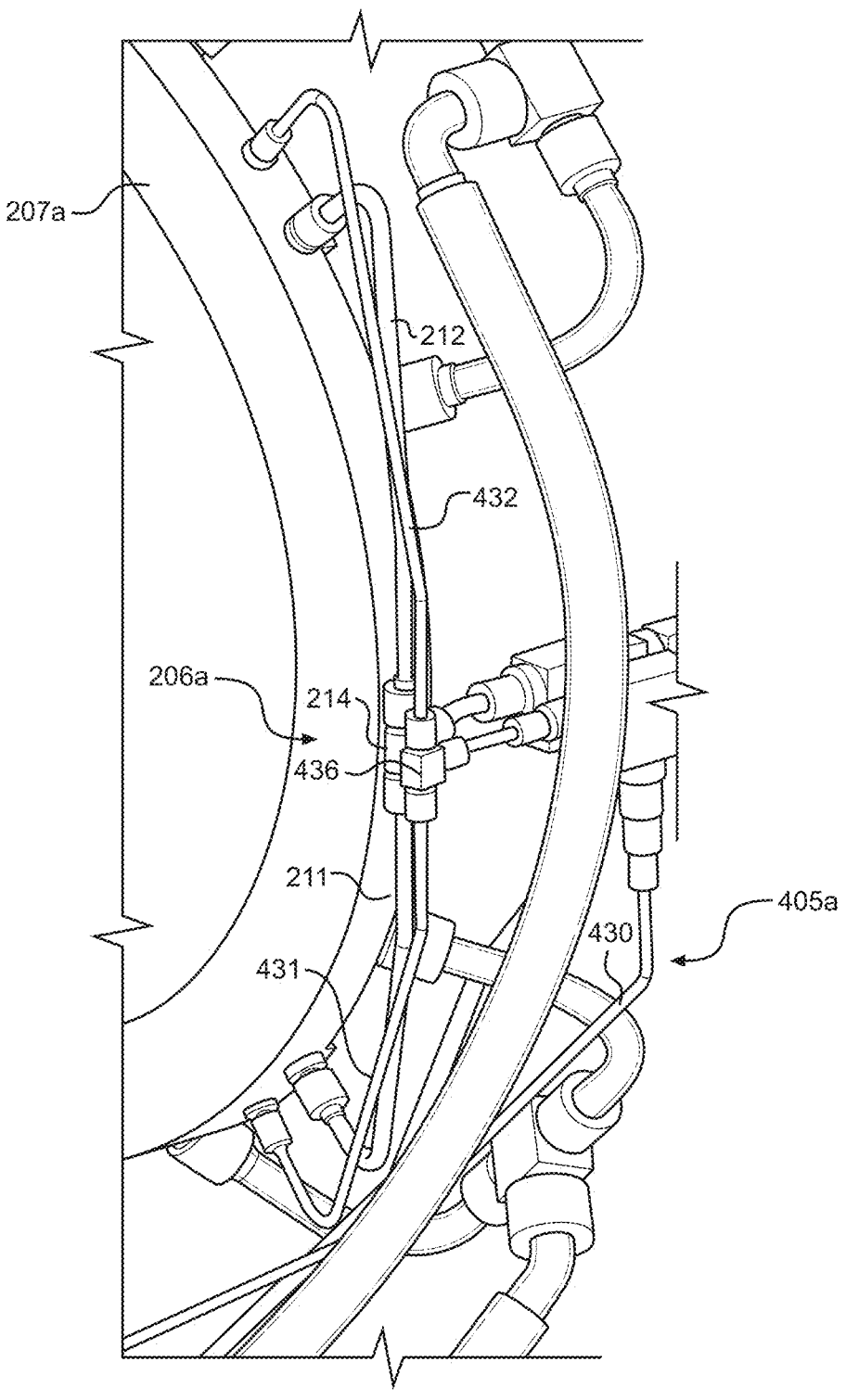
FIG. 5B is an inset view of FIG. 5A showing a cross fitting in the primary line network coupled to the purge system.
Figure 5C:
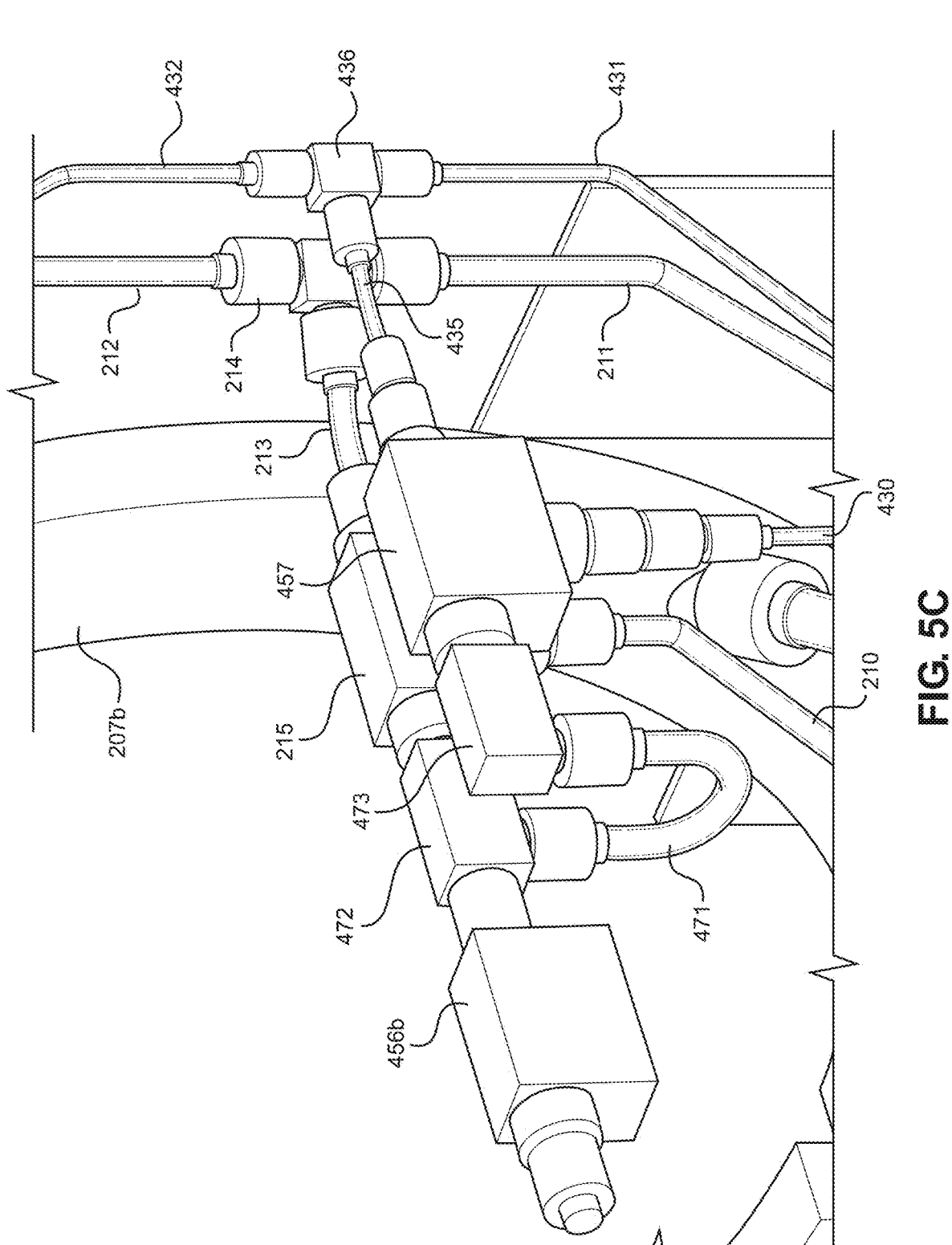
FIG. 5C is an inset view of FIG. 5A showing the tee fittings for the primary lines and the secondary lines in the purge system.
Figure 5D:
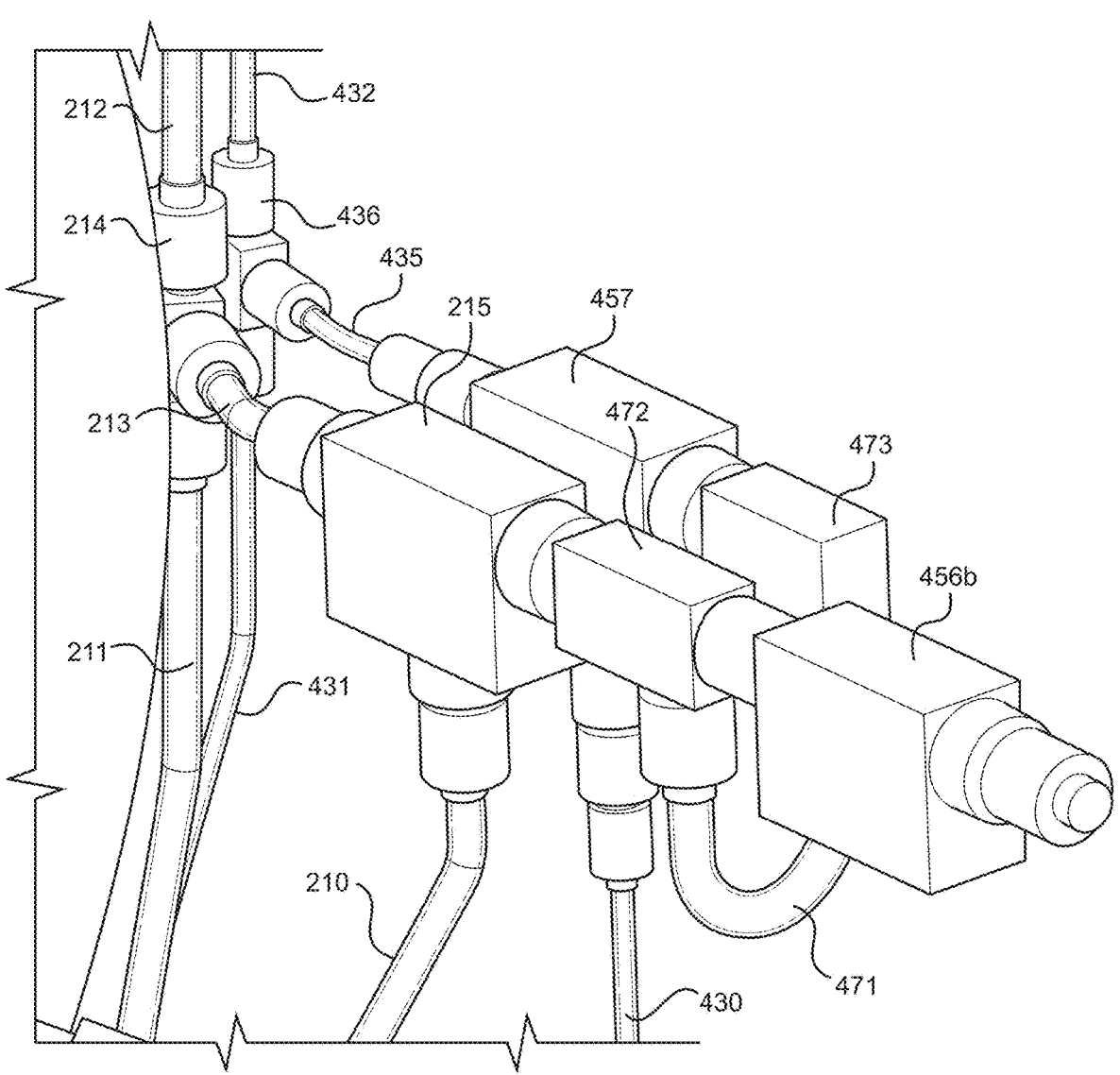
FIG. 5D shows a top, front, left perspective view of the secondary line network coupled to the purge system in the dual-fuel turbine engine of FIG. 5A.

FIGS. 5A and 5B show additional views of the fluidic connections for the primary line network 405a and the secondary line network 206a. In addition to the primary line network 405a being designed to have similar fluidic connections as the secondary line networks 206a, the various components of the primary line network 405a may also be disposed proximate to one another. In particular, FIGS. 5C and 5D show the fittings 215 and 457 may be disposed side by side, in part, to reduce the length of the connector tube 471 used to fluidically couple the fittings 215 and 457 to the fitting 456a. In some instances, a check valve may be implemented between the fitting 215 and the secondary line 210 and the fitting 457 and the primary line 430. Additionally, one or more reducers may be incorporated, for example, at the fluidic connections between the fittings 472 and 215 or the elbow connector 473 and the fitting 457 to modify the flow rate and/or pressure of purging fluid through the primary line networks 405a and 405b and the secondary line networks 206a and 206b.

4. CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A dual-fuel turbine engine configured to receive liquid fuel and natural gas, wherein, during operation of the dual-fuel turbine engine, only one of the liquid fuel or the natural gas is used for combustion and the dual-fuel turbine engine is further configured to switch between the liquid fuel and the natural gas, the dual-fuel turbine engine comprising:

a fuel manifold having a first passage to carry a first portion of the liquid fuel, a second passage to carry a second portion of the liquid fuel, and a third passage to carry the natural gas;

a natural gas intake system, fluidically coupled to the fuel manifold, to provide the natural gas;

a liquid fuel intake system to provide the liquid fuel;

a primary line network, fluidically coupled to the liquid fuel intake system and the fuel manifold, to carry the first portion of the liquid fuel;

a secondary line network, fluidically coupled to the liquid fuel intake system and the fuel manifold, to carry the second portion of the liquid fuel; and a purge system, fluidically coupled to the primary line network, the secondary line network, and the third passage, to continuously provide a purging fluid, the purge system comprising a purge dividing fitting fluidically coupled to a primary liquid fuel dividing fitting of the primary line network and to a secondary liquid fuel dividing fitting of the secondary line network, wherein when the natural gas is used for combustion, the purge system flows the purging fluid through the first passage via the primary line network and the second passage via the secondary line network simultaneously; and wherein when the liquid fuel is used for combustion, the purge system flows the purging fluid through the third passage.

2. The dual-fuel turbine engine of claim 1, wherein:
the primary liquid fuel dividing fitting comprises a first port, a second port, a third port, and a fourth port;
the primary line network further comprises:
    a first primary line fluidically coupled to the liquid fuel intake system and the first port of the primary liquid fuel dividing fitting; and
    a second primary line fluidically coupled to the second port of the primary liquid fuel dividing fitting and the fuel manifold;
the third port of the primary liquid fuel dividing fitting is fluidically coupled directly to the fuel manifold; and
the purge dividing fitting is fluidically coupled to the fourth port of the primary liquid fuel dividing fitting.

3. The dual-fuel turbine engine of claim 1, wherein the purge system comprises:
    a valve fluidically coupled to a purge source, the first passage, the second passage, and the third passage; and
    a switch, operably coupled to the valve, to actuate the valve in response to a signal from a control system of the dual-fuel turbine engine.

4. The dual-fuel turbine engine of claim 1, wherein the purge system is configured to flow the purging fluid at a pressure of about 200 psig to about 250 psig.

5. The dual-fuel turbine engine of claim 4, wherein the purge system is configured to flow the purging fluid at a flow rate equal to or greater than 3 standard cubic feet per minute (SCFM).

6. A method of operating a dual-fuel turbine engine configured to receive liquid fuel and gaseous fuel, the dual-fuel turbine engine comprising:
    a fuel manifold having a first passage to carry a first portion of the liquid fuel, a second passage to carry a second portion of the liquid fuel, and a third passage to carry the gaseous fuel,
    a primary line network connecting a liquid fuel source to the first passage of the fuel manifold via a first passage,
    a secondary line network connecting the liquid fuel source to the second passage of the fuel manifold via a second passage, and
    a gaseous fuel intake system connecting to the third passage of the fuel manifold via a third passage, and
    a purge system fluidly coupled to the primary line network, the secondary line network, and the third passage and comprising a purge dividing fitting fluidically coupled to a primary liquid fuel dividing fitting of the primary line network and to a secondary liquid fuel dividing fitting of the secondary line network,
the method comprising:
supplying the first portion of the liquid fuel from the liquid fuel source to the first passage of the fuel manifold via the primary line network and the first passage to facilitate startup of the dual-fuel turbine engine;
supplying the second portion of the liquid fuel to the second passage of the fuel manifold via the secondary line network and the second passage to fuel the dual-fuel turbine engine;
switching from the liquid fuel to gaseous fuel for fueling the dual-fuel turbine engine; and
continuously flowing a purging fluid through the first passage via the purge dividing fitting and the primary liquid fuel dividing fitting of the primary line network and through the second passage via the purge dividing fitting and the secondary liquid fuel dividing fitting of the secondary line network while fueling the dual-fuel turbine engine with the gaseous fuel from the gaseous fuel intake system via the third passage that receives the gaseous fuel from the gaseous fuel intake system; and
continuously flowing the purging fluid through the third passage when the liquid fuel is used for combustion.

7. The method of claim 6, wherein flowing the purging fluid through the first passage and the second passage occurs simultaneously.

8. The method of claim 6, further comprising: flowing the purging fluid through the first passage and the second passage at different flow rates and/or different flow pressures while fueling the dual-fuel turbine engine with the gaseous fuel.

9. A dual-fuel turbine engine comprising:
    a fuel manifold to combust liquid fuel or gaseous fuel;
    a liquid fuel intake system, in fluid communication with the fuel manifold, to supply a first portion of the liquid fuel to the fuel manifold via a first liquid fuel dividing fitting and a first passage of the fuel manifold for start-up of the dual-fuel turbine engine and to supply a second portion of the liquid fuel to the fuel manifold via a second liquid fuel dividing fitting and a second passage of the fuel manifold for powering the dual-fuel turbine engine;
    a gaseous fuel intake system, in fluid communication with the fuel manifold, to supply the gaseous fuel to the fuel manifold via a third passage of the fuel manifold; and
    a purge system, in fluid communication with the fuel manifold, to continuously purge (i) the first passage via a purge dividing fitting fluidically coupled to the first liquid fuel dividing fitting and (ii) the second passage of the fuel manifold with purging fluid via the purge dividing fitting and the second liquid fuel dividing fitting while the gaseous fuel intake system supplies the gaseous fuel to the fuel manifold via the third passage of the fuel manifold and to continuously purge the third passage of the fuel manifold with the purging fluid while the liquid fuel intake system supplies the first portion of the liquid fuel to the fuel manifold via the first passage and the second portion of the liquid fuel to the fuel manifold via the second passage.

10. The dual-fuel turbine engine of claim 9, wherein the purge system comprises:
    a valve configured to connect to a purge source; and
    a switch, operably coupled to the valve, to actuate the valve in response to a signal from a control system of the dual-fuel turbine engine.

11. The dual-fuel turbine engine of claim 9, wherein the purge system is configured to flow the purging fluid through the first passage and the second passage at different flow rates and/or different flow pressures while the gaseous fuel intake system supplies the gaseous fuel to the fuel manifold via the third passage of the fuel manifold.

12. The dual-fuel turbine engine of claim 9, wherein the first liquid fuel dividing fitting is a four-port fitting.

13. The dual-fuel turbine engine of claim 9, wherein the purge system is configured to flow the purging fluid at a pressure of about 200 psig to about 250 psig.

14. The dual-fuel turbine engine of claim 13, wherein the purge system flows the purging fluid at a flow rate equal to or greater than 3 standard cubic feet per minute (SCFM).

\* \* \* \* \*